United States Patent [19]

Hein et al.

[11] 4,369,982
[45] Jan. 25, 1983

[54] SPINE BOARD

[76] Inventors: James R. Hein, 500 Gordon; Wayne T. Herr, Sr., 359 Madison; John J. Niemiec, 1360 Memorial; Philip Dombrowski, 1273 Price, all of Calumet City, Ill.

[21] Appl. No.: 216,384

[22] Filed: Dec. 15, 1980

[51] Int. Cl.³ .............................................. B62B 1/06
[52] U.S. Cl. .............................. 280/47.13 R; 5/82 R; 128/134; 296/20
[58] Field of Search ................. 280/47.13 R; 5/82 R, 5/81 R; 296/20; 128/78, 87 R, 134 R

[56] References Cited
U.S. PATENT DOCUMENTS 2,607,050 8/1952 Binschoff .............................. 5/81 R
2,919,138 12/1959 Brower et al. ............... 280/47.13 R
3,358,141 12/1967 Hoffman et al. ...................... 5/81 R
3,609,778 10/1971 Zeiner ...................................... 5/82

Primary Examiner—Duane A. Reger
Assistant Examiner—Donald W. Underwood
Attorney, Agent, or Firm—Robert E. Knechtel; Basil E. Demeur

[57] ABSTRACT

An improved spine board having a detachably positionable foot support assembly to prevent the individual from sliding off of the spine board when it is raised to a substantially vertical position, or a wheel assembly which is removably affixed to the spine board so that the spine board can be easily transported by one person by wheeling it, or both.

2 Claims, 5 Drawing Figures

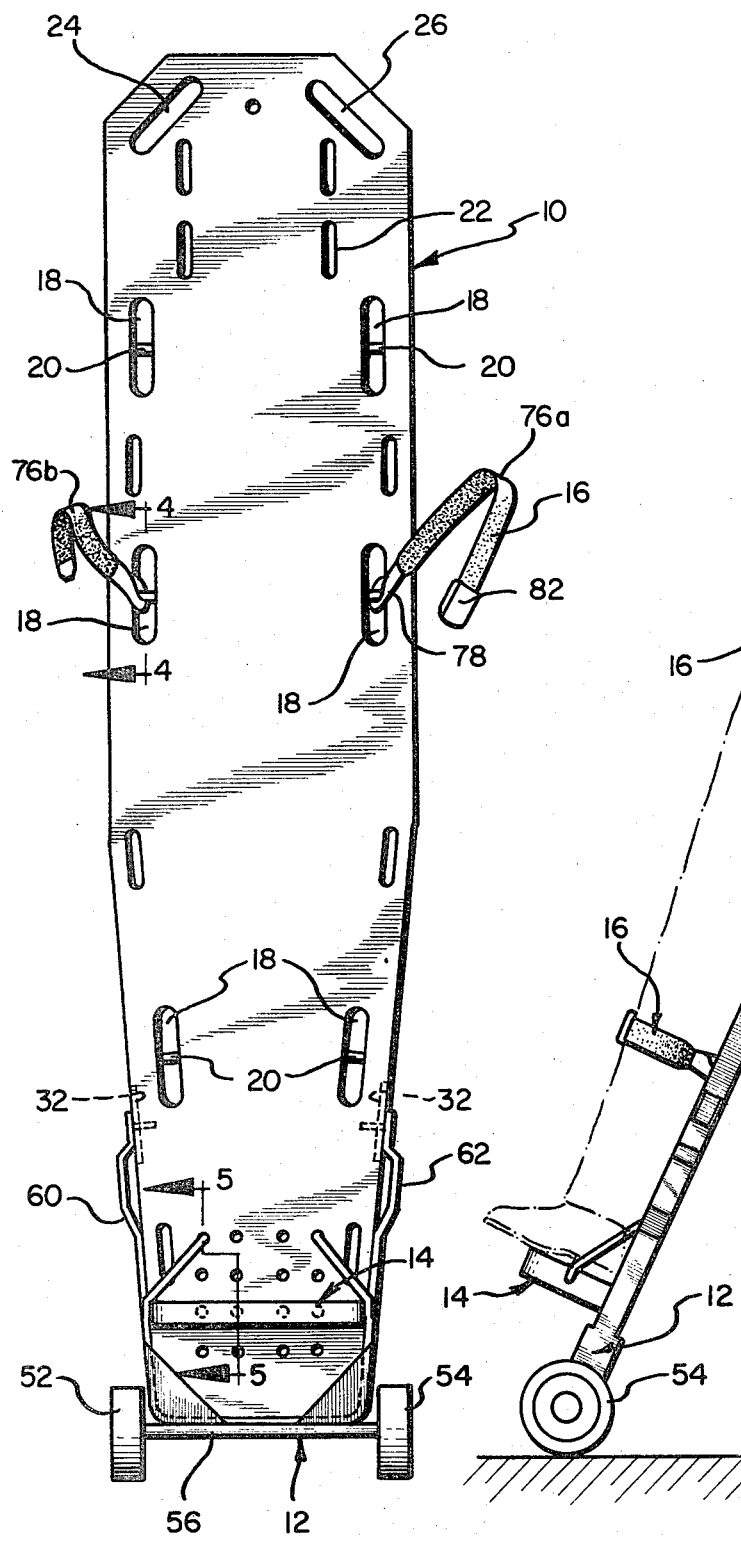
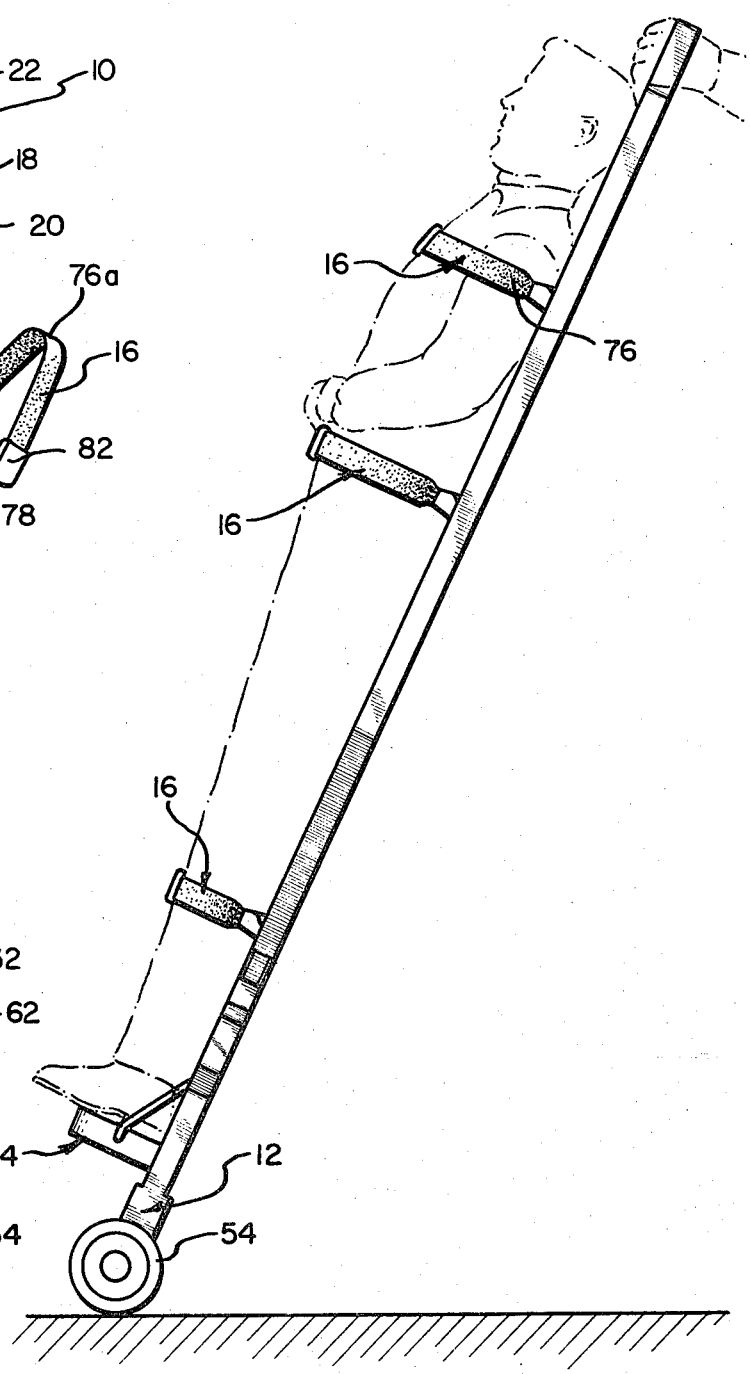

U.S. Patent   Jan. 25, 1983   Sheet 2 of 2   4,369,982
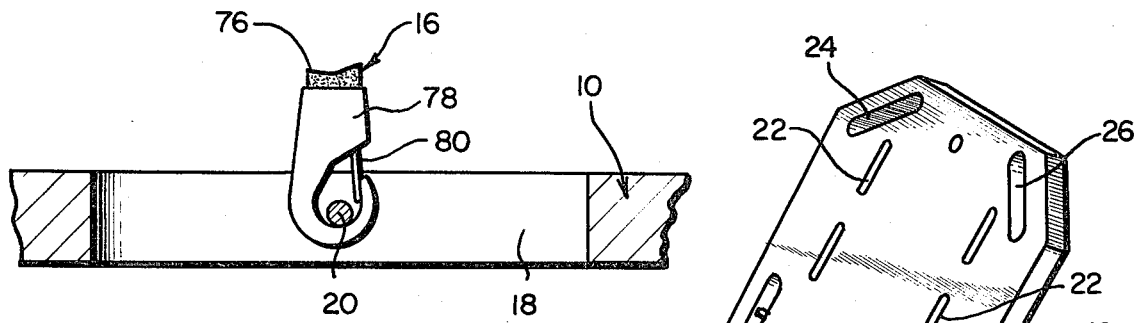
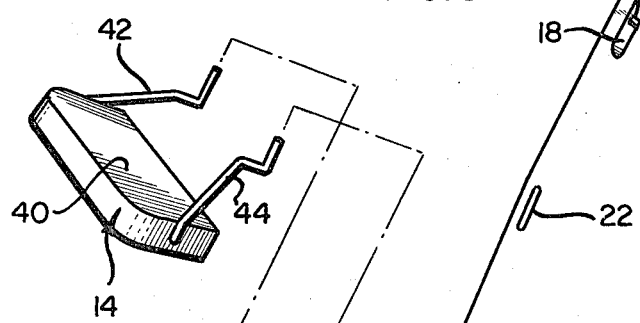
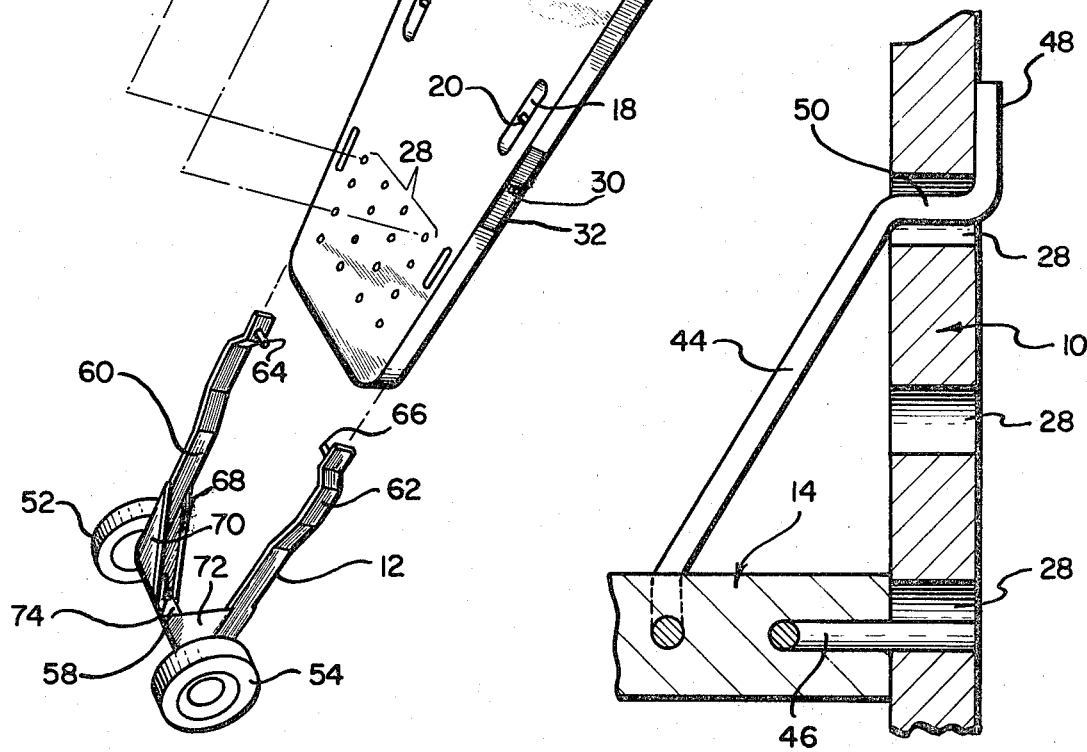

SPINE BOARD

This invention relates to an improved spine board of the type generally used by paramedics and other like personnel for transporting injured or incapacitated individuals.

Spine boards are generally well-known and have been used by paramedics and others to transport injured and incapacitated individuals. Generally, in most cases, these spine boards are simply generally rectangular shaped boards upon which the individual can be placed, with straps being utilized to retain the individual on the board. In most cases, such an arrangement is satisfactory, however, there are other cases where such spine boards have proved to be inadequate.

For example, in many cases, it is found that the spine board with the incapacitated party strapped to it must be tilted to a substantially vertical position in order to transport the party out of a room, down narrow hallways and staircases. In such instances, it is exceedingly difficult to not only retain the incapacitated person on the spine board when it is tilted upright to a substantially vertical position, but for two people to carry the spine board with the incapacitated person on it without great difficulty. Generally, the retaining straps are not sufficient to prevent the incapacitated party from simply sliding down the spine board and for the party attempting to carry the lower end of the board to maneuver and to manipulate it.

Other very complex apparatus which generally can be classified as spine boards are available, i.e., ones having collapsible legs, seats and the like, are available. These, however, likewise suffer the same disadvantage in that it is exceedingly difficult to maneuver these types of apparatus through hallways and down stairwells.

Accordingly, it is an object of the present invention to provide an improved spine board, one which can be easily utilized by one person to transport an incapacitated individual.

More particularly still, it is an object to provide an improved spine board of the above-described type having a detachably positionable foot support assembly to prevent the individual from sliding off of the spine board when it is raised to a substantially vertical position, or a wheel assembly which is removably affixed to the spine board so that the spine board can be easily transported by one person by wheeling it, or both.

DESCRIPTION OF THE DRAWINGS

For a fuller understanding of the nature and objects of the invention, reference should be had to the following detailed description taken in connection with the accompanying drawings, in which:

FIG. 1 is a top plan view of a spine board exemplary of the present invention, with both the detachably adjustable foot support assembly and the wheel assembly affixed to it;

FIG. 2 is a side plan view of the spine board of FIG. 1, generally illustrating the manner in which an injured or incapacitated individual can be retained and supported on it;

FIG. 3 is an exploded perspective view of the spine board of FIG. 1;

FIG. 4 is a sectional view taken along lines 4—4 of FIG. 1; and

FIG. 5 is a partial sectional view generally illustrating the manner in which the foot support assembly is detachably adjustably affixed to the spine board.

DESCRIPTION OF A PREFERRED EMBODIMENT

Referring now to the drawings, a spine board 10 having a wheel assembly 12 and a foot support assembly 14 affixed to it is shown. The wheel assembly 14 and the foot support assembly 14 both are removably attached to the spine board, as more fully described below. In addition, the foot support assembly is detachably positionable on the spine board 10. Preferably and advantageously, the spine board 10 also includes a plurality of strap assemblies 16 which likewise are removably affixed to the spine board. As can be best seen in FIG. 2, with the wheel assembly 12 and the foot support assembly 14 affixed to the spine board 10, an injured or incapacitated person can be placed on the spine board 10 with the individual's feet engaged with the foot support assembly 14, and then strapped thereon by means of one or more strap assemblies 16. Once positioned on the spine board 10 and the strap assemblies 16 positioned to secure the injured or incapacitated person on the spine board 10, the spine board 10 can be tilted to a substantially vertical position and the individual transported by simply wheeling the spine board 10, with little concern that the individual will slide off of the spine board 10 since his feet are firmly supported by the foot support assembly 14. Accordingly, with the spine board 10 of the present invention, it is relatively easy for one person to transport an injured or incapacitated person in even the most confining space or location.

More particularly, the spine board 10 is of a generally rectangular shape and has along each of its sides a plurality of elongated slots 18. These slots are in pairs and are diametrically opposed to one another and have pins 20 disposed transversely to the slot to receive the hooks 78 of the strap assembly 16 described more fully below. Additional elongated slots 22 are located near the top end of the board, as illustrated in FIG. 1, and along the opposite sides of the board for receiving additional retaining straps, if necessary. A pair of elongated slots are provided at the top end of the board, as illustrated in FIG. 1, and form hand grips 24 and 26 which enable a person to extend his fingers through these hand grips 24 and 26 to support and to maneuver the spine board 10. The bottom or opposite end of the spine board 10, as illustrated in FIG. 1, is provided with a plurality of pin receiving apertures 28 which are horizontally and vertically aligned for detachably and positionably securing the foot support assembly 14 to the spine board 10, as more particularly described below. A pair of pin receiving apertures 30 are formed in each of the side edges of the spine board 10 near the lower end thereof, in diametrically opposed positions, for receiving the pins 64 and 66 of the wheel assembly for removably securing the wheel assembly 12 to the spine board 10 as more particularly described below. In addition, advantageously reinforcing plates 32 can be provided in the side edges of the spine board to strengthen it at the location where the pin receiving apertures 30 are formed in it. These reinforcing plates 32 can be of, for example, metal or similar type of material, which will provide the additional strength to the board. The spine board 10 can be economically fabricated of plywood, however, its construction is not limited to wood but can be of any type of material providing sufficient strength to support an incapacitated person on it.

The foot support assembly 14, as can be best seen in FIGS. 3 and 5, includes a generally rectangular shaped foot support 40 which may be of wood or other similar material of sufficient strength to support an injured or incapacitated person on it when the spine board 10 is tilted to a substantially vertical position. The foot support assembly 14 also includes a pair of fastening pins 42 and 44 which are secured to the foot support 40 and extend angularly upwardly from the foot support 40 to a horizontally extending portion 50 of a length to extend through the spine board 10. The horizontally extending portion 50 terminates in a vertically extending portion 48 which extends upwardly behind the surface of the spine board 10 a sufficient length to provice rigidity to the foot support assembly 14. A pair of support pins 46 likewise are affixed to the foot support 40 and are positioned to be received within the respective ones of the apertures 28 in the spine board 10 to position and to support the foot support assembly 14.

To detachably and positionably affix the foot support assembly 14 to the spine board 10, the foot support assembly 14 is positioned with respect to the spine board 10 such that the vertically extending portion 48 of the fastening pins 42 and 44 can be extended through a pair of the pin receiving apertures 28 in the spine board. Once the vertically extending portions 48 are extended through the apertures 28, the foot support assembly 14 is pivotally rotated to engage the support pins 46 in a pair of apertures 28, as generally illustrated in FIG. 5. Once the foot support 40 of the foot support assembly 14 abuts against the surface of the spine board 10, the foot support assembly 14 is securely affixed to the spine board. Any downward force on the foot support 40 is counteracted by the vertically extending portions 48 of the fastening pins 42 and 44, which are engaged against the back of the spine board 10.

The wheel assembly 12 includes a pair of wheels 52 and 54 which are secured in spaced apart relationship to an axle 56. The axle 56 is secured to the horizontally extending portion of a generally U-shaped support member 58, and the upright portions thereof form arms 60 and 62. At the end of each of the respective arms 60 and 62 are pins 64 and 66, which are adapted and proportion to be received within the pin receiving apertures 30 in the side wall of the spine board 10. A pair of triangular shaped support brackets 68 and 70 are secured to the arms 60 and the horizontally extending portion of the U-shaped support member 58 to provide additional rigidity to the wheel assembly 12 and to provide a pocket 74 between them for receiving therein the end of the spine board 10 to securely affix the wheel assembly 12 to the spine board. A similar pair of triangular support brackets only one of which, triangular support bracket 72 is shown, likewise is affixed to the arm 62 and to the horizontally extending portion of the U-shaped support member 58.

To affix the wheel assembly 12 to the spine board 10, the arms 60 and 62, which are sufficiently resilient to permit them to be urged outwardly to receive the end of the spine board 10 between them, are expanded to permit the spine board 10 to be seated within the pockets 74 formed by the triangular shaped support brackets, with the lower edge of the spine board 10 resting on the horizontally extending portion of the U-shaped support member 58. Once positioned in this fashion, the pins 64 and 66 on the ends of the arms 60 and 62 are seated within the pin receiving apertures 30 in the side edges of the spine board 10, as can be best seen in FIG. 1. Once the pins 64 and 66 are seated within these apertures 30, the wheel assembly is removably and securely affixed the spine board 10.

The strap assemblies 16, include strap portions 76a and 76b, each of which has on one end thereof, a hook 78 which is adapted to engage with the pins 20 within the elongated slots 18 in the spine board 10 to affix the strap assembly 16 to the spine board 10. The hook assembly also includes a resilient member which forms a lock 80 for securely retaining the hook 78 affixed to the pins 20. One of the straps 76a and 76b has thereon a buckle 82 through which is received the end of the other one of the two strap portions 76a or 76b to adjustably lockingly position the strap assembly 16 in generally the same fashion as a seat belt in an automobile functions. In other words, once the injured or incapacitated person is placed on the board and the strap assembly 16 is placed about him, the end of one strap 76a or 76b is extended through the buckle 82 and snugged up tightly against the individual to firmly support him in position on the spine board 10. As indicated above, a plurality of strap assemblies 16, as required, can be utilized to secure the injured or incapacitated individual to the spine board.

From the above description, it can be seen that a spine board 10 which provides a substantial improvement over existing similar types of spine boards is provided. A spine board 10 can be utilized with only the foot support assembly removably positionably affixed to it to prevent the injured or incapacitated person from sliding on the spine board. In addition, by removably affixing the wheel assembly 12 to the spine board 10, the spine board 10 can be transported with the injured or incapacitated person secured on it, simply by wheeling it, generally as illustrated in FIG. 2.

It will thus be seen that the objects set forth above, among those made apparent from the preceding description, are efficiently attained and certain changes may be made in the above article. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A spine board comprising, in combination: an elongated generally rectangular-shaped board having a top end and a bottom end, one side of said board comprising a front side and the other side thereof comprising a back side, at least one retaining strap, a plurality of pairs of elongated slots disposed diametrically opposite one another adjacent the side edges of said board along the length thereof for receiving a retaining strap, a pin in each of said elongated slots in said board extending transversely across said slots, said retaining strap being of a two piece construction and comprising a pair of straps having on one end thereof a hook lockingly engageable with the respective ones of said pins in said elongated slots, a buckle on the opposite end of one of said pair of strays for receiving and lockingly adjustably retaining the opposite end of the other one of said pair of straps, and a plurality of pin receiving apertures in said board adjacent the bottom end thereof positioned to receiving therein the respective arms and support pins of a foot support assembly to removably positionally affix said foot support assembly to said board; a foot support assembly comprising a generally rectangular foot support, a pair of arms having one end thereof affixed to said foot support and extending angularly laterally upwardly therefrom, the opposite ends of said pair of arms being formed to extend through said pin receiving apertures in said board and to lockingly engage with the back side of said board, said pair of arms affixed to said foot support, further comprising a horizontally extending portion of a length to extend from the front side of said board to the back side thereof, said horizontally extending portion terminating with a vertically extending portion which engages with the back side of said board, and a pair of support pins having one end thereof affixed to said foot support and positioned to permit the opposite ends of said pins to seat within said pin receiving apertures when said foot support is abutted against the front side of said board and said arms are lockingly engaged within said pin receiving apertures; a pin receiving aperture in each of the opposite side edges of said board in diametrically opposed relationship; and a wheel assembly removably affixed to said board, said wheel assembly comprising a generally U-shaped member having a horizontally extending portion and a pair of spaced apart arms for receiving therebetween the bottom end of said board, a pin affixed to the ends of each of said arms proportioned and positioned to be received within the respective ones of said pin receiving apertures in the opposite side edges of said board to removably affix said wheel assembly to said board, and a pair of wheels rotatably supported in spaced apart relationship by said U-shaped member to permit said board to be transported by rolling it on said wheels.

2. The spine board of claim 1, wherein said wheel assembly further comprises means forming a pocket for receiving therein the bottom end of said spine board to securely removably affix said wheel assembly to said spine board.

* * * * *